US011939804B2

(12) United States Patent
Laws

(10) Patent No.: US 11,939,804 B2
(45) Date of Patent: Mar. 26, 2024

(54) HINGE

(71) Applicant: BEYOND ARCHITECTURAL PTY LTD, Matraville (AU)

(72) Inventor: Adam Laws, Hunter Hills (AU)

(73) Assignee: BEYOND ARCHITECTURAL PTY LTD, Matraville (AU)

(*) Notice: Subject to any disclaimer, the term of this patent is extended or adjusted under 35 U.S.C. 154(b) by 49 days.

(21) Appl. No.: 17/614,403

(22) PCT Filed: May 27, 2020

(86) PCT No.: PCT/AU2020/050525
§ 371 (c)(1),
(2) Date: Nov. 26, 2021

(87) PCT Pub. No.: WO2020/237303
PCT Pub. Date: Dec. 3, 2020

(65) Prior Publication Data

US 2022/0235594 A1 Jul. 28, 2022

(30) Foreign Application Priority Data

May 27, 2019 (AU) ................................ 2019901811
Feb. 26, 2020 (AU) ................................ 2020900548

(51) Int. Cl.
*E05D 5/02* (2006.01)
*E05F 1/06* (2006.01)
(Continued)

(52) U.S. Cl.
CPC ................ *E05F 1/063* (2013.01); *E05F 3/02* (2013.01); *E05F 3/20* (2013.01); *E05F 5/02* (2013.01);
(Continued)

(58) Field of Classification Search
CPC ... E05F 1/063; E05F 1/061; E05F 1/06; E05F 3/02; E05F 3/20; E05F 3/04; E05F 3/10;
(Continued)

(56) References Cited

U.S. PATENT DOCUMENTS 2,685,102 A * 8/1954 Forkey ...................... E05D 3/02 16/284
3,545,031 A * 12/1970 Dielman ................ E05F 1/063 16/314
4,829,628 A * 5/1989 Vuksic ...................... E05F 3/20 16/DIG. 9
5,205,072 A * 4/1993 Eutebach ................ A47K 3/36 16/382
(Continued)

FOREIGN PATENT DOCUMENTS

AU 2017216444 B1 * 3/2018 ............... E05D 3/02
AU 2019100867 A4 * 9/2019
(Continued)

OTHER PUBLICATIONS

International Search Report for PCT/AU2020/050525.

*Primary Examiner* — Chuck Y Mah
(74) *Attorney, Agent, or Firm* — Bauer and Joseph

(57) ABSTRACT

One aspect relates to a frameless glass fencing hinge (10) for a frameless glass fencing installation a first leaf assembly (12) for operative attachment to a first glass panel or building structure. The frameless glass fencing hinge (10) includes a second leaf assembly (14) for operative attachment to a second glass panel. The second leaf assembly (14) is operatively adapted to undergo pivotal movement about a hinge axis (16) so as to move the second glass panel between a closed position an open position. The first leaf assembly (12) and the second leaf assembly (14) define a cam formation (16) operatively adapted to cause the second leaf assembly (14) to undergo axial movement along the hinge axis (16) between a rest position and a biased position when the second leaf (14) assembly undergoes pivotal movement about the hinge axis (16).

8 Claims, 10 Drawing Sheets

(51) Int. Cl.

| | |
|---|---|
| ***E05F 3/02*** | (2006.01) |
| ***E05F 3/20*** | (2006.01) |
| ***E05F 5/02*** | (2006.01) |
| ***E06B 11/02*** | (2006.01) |

(52) U.S. Cl.
CPC ......... *E06B 11/02* (2013.01); *E05Y 2900/132* (2013.01)

(58) Field of Classification Search
CPC ... E05F 5/02; E05F 1/1215; E05F 1/12; E05F 1/1207; E05F 3/18; E05F 5/00; E05F 11/385; E06B 11/02; E06B 11/026; E06B 3/54; E05D 5/0246; E05D 5/0253; E05D 5/0261; E05D 5/0269; E05D 7/04; E05D 3/02; E05D 2007/0469; E05D 2005/0263; E05D 2005/0261; E05D 2005/0269; E05D 7/081; E05D 7/08; E05D 2003/027; E05Y 2900/114; E05Y 2900/132; E05Y 2600/502; E05Y 2600/60; E05Y 2201/11; A47K 3/362; A47K 2003/367; A47F 3/12; A47F 3/125
See application file for complete search history.

(56) References Cited

U.S. PATENT DOCUMENTS

| | | | | |
|---|---|---|---|---|
| 2002/0116788 | A1* | 8/2002 | Pompei | E05F 1/063 16/315 |
| 2005/0011046 | A1* | 1/2005 | Dionysian | E05F 1/063 16/316 |
| 2005/0246863 | A1 | 11/2005 | Chestworth et al. | |
| 2014/0033476 | A1* | 2/2014 | Bacchetti | E05F 3/20 16/52 |
| 2019/0211602 | A1* | 7/2019 | Stuart | E05F 3/20 |
| 2022/0186539 | A1* | 6/2022 | Xue | E05D 5/0246 |

FOREIGN PATENT DOCUMENTS

| | | | | |
|---|---|---|---|---|
| DE | 102010004134 | A1 | | 7/2011 |
| EP | 2233672 | B1 | | 11/2014 |
| JP | 11343769 | A | * | 12/1999 |
| JP | 2011127282 | A | | 6/2011 |
| JP | 2018009380 | A | * | 1/2018 |
| KR | 200312347 | Y1 | * | 5/2003 |
| KR | 1552218 | B1 | * | 9/2015 |

* cited by examiner

HINGE

CROSS REFERENCE TO RELATED APPLICATIONS

The present application is a U.S. national stage application of PCT International Application No. PCT/AU2020/050525, filed May 27, 2020, and published as PCT Publication WO/2020/237303 on Dec. 3, 2020, which claims priority to Australian Application No. AU 2019901811, filed on May 27, 2019 and to Australian Application No. AU 2020900548, filed on Feb. 26, 2020. The disclosures of all the foregoing applications are hereby incorporated by reference in their entirety into the present application.

FIELD

The invention relates to a hinge, in particular but not exclusively, a frameless glass fencing hinge for a self-closing gate or door such as a frameless glass fencing swimming pool gate.

BACKGROUND

Swimming pool barriers are designed such that young children are unable to climb over them and most countries have strict laws governing what constitutes an acceptable pool barrier. In Australia, for example, all swimming pool barrier fencing must comply with the Australian Standard for Swimming Pool Fencing (AS1926). Some of the stipulations in that standard require that pool fencing be at least 1,200 mm high and that gates be built in such a way that they swing away from the pool and have a child safety lock. It is also a requirement that swimming pool gates be self-closing and self-latching.

It has become fashionable to provide swimming pool barriers in the form of frameless glass fences. Not only is glass durable to the moist environment of a swimming pool, it also provides an aesthetic appealing appearance which is in vogue in contemporary architectural design. A typical frameless glass fence for a pool includes a plurality of individual tempered glass panels which are supported by spaced apart mini-posts, referred to as spigots. Typically, two spigots are evenly spaced across the bottom edge of the glass panel and will clamp onto the panel and support it. To ensure personal safety, the gate of a frameless glass swimming pool fence is required to include a self-closing hinge and a self-closing latch.

It is desirable that self-closing hinges include a soft-close assembly to ensure the long-term reliability of such hinges. This is particularly desirable in frameless glass fencing installations as such hinges will lower impact forces when the gate is closed to avoid damage to glass panels. Existing hinges with an inbuilt soft-close assembly, however, suffer from various drawbacks which often result in premature failure. For example, self-close hinge assemblies which employ a spring mechanism often fail due to corrosion or fatigue. Hydraulically actuated self-close hinges, in turn, are prone to failure resulting from hydraulic fluid leakage. Other self-close assemblies are prone to failure as a result of continued exposure to environmental factors such as sunshine and rain.

OBJECT

It is an object of the present invention to provide an alternative frameless glass fencing hinge for use in frameless glass fencing installations which addresses or at least ameliorates the above drawbacks associated with existing self-close hinges or which provides a useful alternative.

SUMMARY

According to a first aspect of the present invention there is disclosed herein a frameless glass fencing hinge for a frameless glass fencing installation, the frameless glass fencing hinge including:

a first leaf assembly for operative attachment to a first glass panel or building structure;

a second leaf assembly for operative attachment to a second glass panel, the second leaf assembly operatively adapted to undergo pivotal movement about a hinge axis so as to move the second glass panel between a closed position an open position, and wherein the first leaf assembly and the second leaf assembly define a cam formation operatively adapted to cause the second leaf assembly to undergo axial movement along the hinge axis between a rest position and a biased position when the second leaf assembly undergoes pivotal movement about the hinge axis.

Preferably (i) the first leaf assembly includes a first knuckle body having a first cam surface, and (ii) the second leaf assembly includes a second knuckle body having a second cam surface operatively adapted for contact with the first cam surface, the first and second cam surfaces being configured such that movement of the second cam surface along the first cam surface causes the second leaf assembly to move axially along the hinge axis.

Preferably the first and second cam surfaces are operatively adapted such that movement of the second cam surface along the first cam surface causes the second leaf assembly to be displaced vertically when the second leaf assembly undergoes axial movement along the hinge axis.

Preferably the first and second cam surfaces are adapted to permit the second leaf assembly to move from the biased position to the rest position under the influence of gravity.

Preferably the frameless glass fencing hinge includes a damping assembly operatively adapted to arrest movement of the second leaf assembly between the biased position and the rest position.

In a preferred embodiment the damping assembly includes (i) a piston secured to the first knuckle body, and (ii) a damping chamber defined by an internal surface of the second knuckle body and a face of the piston, wherein movement of the second leaf assembly relative to the first leave assembly causes the volume in the damping chamber to be increased and decreased respectively.

Preferably the piston includes a seal to deter the escape of air from the damping chamber when the volume of the damping chamber is decreased.

Preferably the second knuckle body includes an air-bleed hole in fluid communication with the damping chamber to release air from the damping chamber.

In another preferred embodiment the damping assembly includes an air-bleed control assembly, the air air-bleed control assembly including an adjustor body having a protruding member shaped for location within a complemental cavity defined by the second knuckle body, the cavity being in fluid communication with the damping chamber.

Preferably the location of the protruding member within the cavity of the second knuckle body is adjustable.

In a preferred embodiment the damping assembly includes (i) a damping chamber secured to the first knuckle body, the damping chamber enclosing a resilient damper body, and (ii) a piston secure to the second knuckle body, the piston operatively associated with the resilient damper body such that movement of the second leave assembly from the biased position to the rest position causes movement of the piston so as to bias the resilient damper body.

In another preferred embodiment the damping assembly includes (i) a damping chamber enclosed by the first and second knuckle body, and (ii) a one-way valve within the first knuckle body to control release of air from the damping chamber when the second leaf assembly undergoes axial movement between the biased position and the rest position.

Preferably the first and second leaf assembly each includes a pair of opposing leaf members operatively adapted to hold a glass panel.

Preferably at least a portion of the frameless glass fencing hinge is produced from steel, aluminium or an engineering plastic.

Preferably the first leaf assembly and the second leaf assembly are produced from steel, aluminium or an engineering plastic.

Preferably the steel is mild steel, stainless steel or an alloy steel.

Preferably the engineering plastic is covered with a coating.

Preferably the engineering plastic includes a base material.

Preferably the engineering plastic includes a base material and a reinforcing filler.

Preferably the reinforcing filler includes glass fibre.

Preferably the reinforcing filler includes carbon fibre.

Preferably the engineering plastic is a polyarylamide.

Preferably the polyarylamide includes glass fibre reinforcement wherein the concentration of the glass fibre reinforcement is between 50% to 60% by volume.

Preferably the engineering plastic is an epoxy vinyl ester resin.

Preferably the epoxy vinyl ester resin includes glass fibre reinforcement wherein the concentration of the glass fibre reinforcement is between 50% to 70% by volume.

Preferably the base material includes a polyamide.

Preferably the polyamide includes nylon.

Preferably the base material includes polyphenylene sulphide (PPS).

Preferably the base material includes styrene.

Preferably the damping assembly includes at least one damper operatively adapted to apply a force to the first and second cam surfaces so as to generate friction between the first and second cam surfaces when the second leaf assembly undergoes pivotal movement relative to the first leaf assembly.

According to a further aspect of the present invention there is disclosed herein a hinge including:

a first leaf assembly for operative attachment to a first body;

a second leaf assembly for operative attachment to a second body, the second leaf assembly operatively adapted to undergo pivotal movement about a hinge axis so as to move the second body between a closed position an open position, and wherein the first leaf assembly and the second leaf assembly define a cam formation operatively adapted to cause the second leaf assembly to undergo axial movement along the hinge axis between a rest position and a biased position when the second leaf assembly undergoes pivotal movement about the hinge axis.

BRIEF DESCRIPTION OF THE DRAWINGS

Preferred embodiments of the present invention will be described hereinafter, by way of examples only, with reference to the accompanying drawings, wherein.

DESCRIPTION OF PREFERRED EMBODIMENTS

Figure 1:
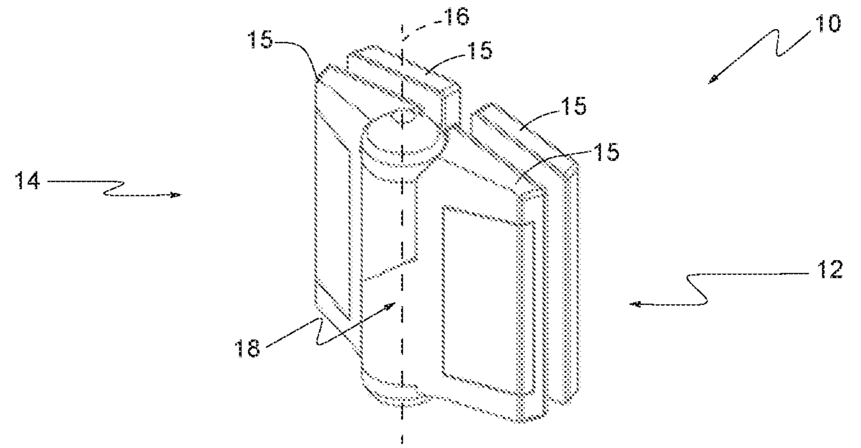
FIG. 1 is a perspective view of a first embodiment frameless glass fencing hinge in a closed position.

FIGS. 1 to 5 show a first embodiment frameless glass fencing hinge, generally indicated with the reference numeral 10, for use in a non-illustrated frameless glass fencing installation. The frameless glass fencing hinge 10 includes a first leaf assembly 12 for operative attachment to a non-illustrated first glass panel. The frameless glass fencing hinge 12 further includes a second leaf assembly 14 for operative attachment to a non-illustrated second glass panel. In this embodiment each of the first and second leaf assemblies 12, 14 includes a pair of opposing leaf members 15 operatively adapted respectively to hold a non-illustrated glass panel between them.

Figure 2:
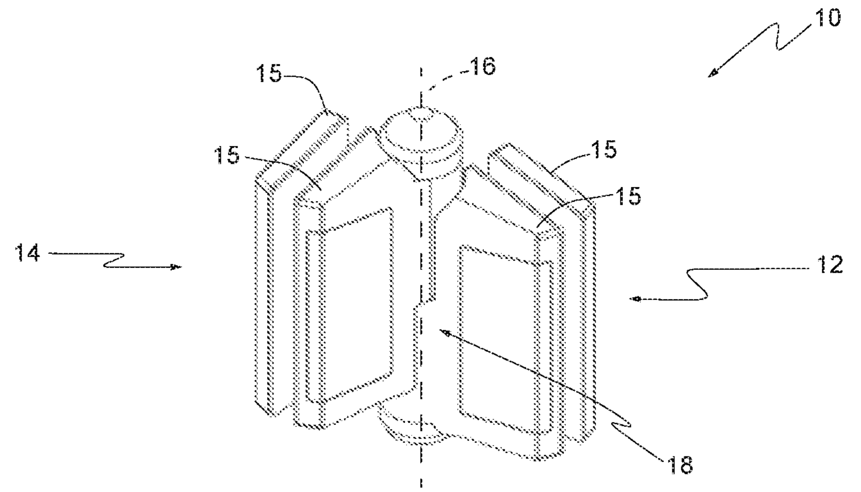
FIG. 2 is a perspective view of the frameless glass fencing hinge of FIG. 1 in an open position.

The second leaf assembly 14 is operatively adapted to undergo pivotal movement about a hinge axis 16 so as to move the second glass panel between a closed position, shown in FIG. 1, and an open position, shown in FIG. 2. The first leaf assembly 12 and the second leaf assembly 14 are adapted to co-operate to define a cam formation, generally indicated with the reference numeral 18. The cam formation 18 is operatively adapted to cause the second leaf assembly 14 to undergo axial movement along the hinge axis 16 between a rest position, shown in FIG. 1, and a biased position, shown in FIG. 2, when the second leaf assembly 14 undergoes pivotal movement about the hinge axis 16.

Figure 3:
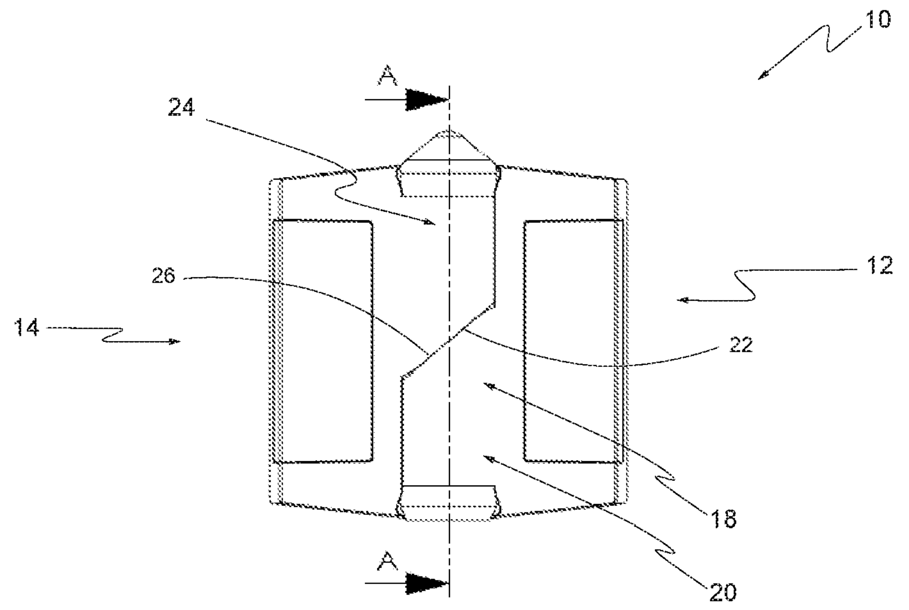
FIG. 3 is a front view of the frameless glass fencing hinge of FIG. 1.

The first leaf assembly 12 includes a first knuckle body 20 having a first cam surface 22, shown in FIG. 3. The second leaf assembly 14 includes a second knuckle body 24 having a second cam surface 26, also shown in FIG. 3. The second cam surface 26 is operatively adapted for contact with the first cam surface 22. The first and second cam surfaces 22, 26 are configured in such a manner that movement of the second cam surface 26 along the first cam surface 22 causes the second leaf assembly 14 to move axially along the hinge axis 16. In use the frameless glass fencing hinge 10 will be installed upright with the second cam surface 26 located on top of the first cam surface 22. The effect of this is that movement of the second cam surface 26 along the first cam surface 22 causes the second leaf assembly 14 to be displaced vertically upwards as the second leaf assembly 14 undergoes axial movement along the hinge axis 16.

The first and second cam surfaces 22, 26 are adapted to permit the second leaf assembly 14 to move from the biased position, shown in FIG. 2, to the rest position, shown in FIG. 1 under the influence of gravity. To arrest movement of the second leaf assembly 14 between the biased position and the rest position a damping assembly 28, shown in FIGS. 4 and 5, is provided.

Figure 4:
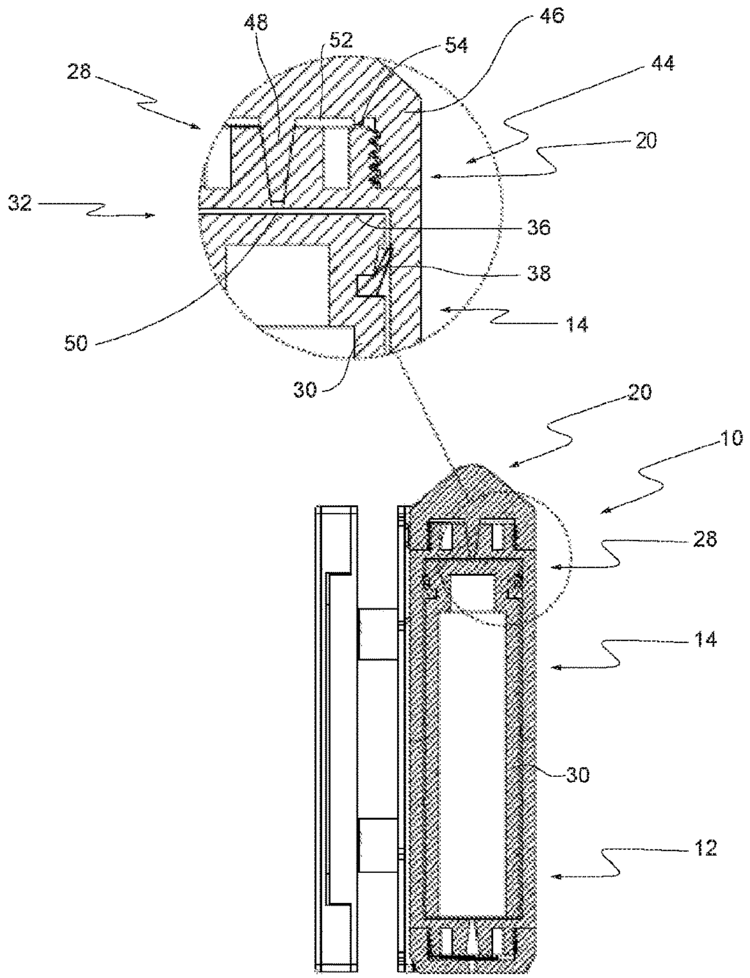
FIG. 4 is a cross-sectional view along the line A-A in FIG. 3 with the frameless glass fencing hinge in a closed position.
Figure 5:
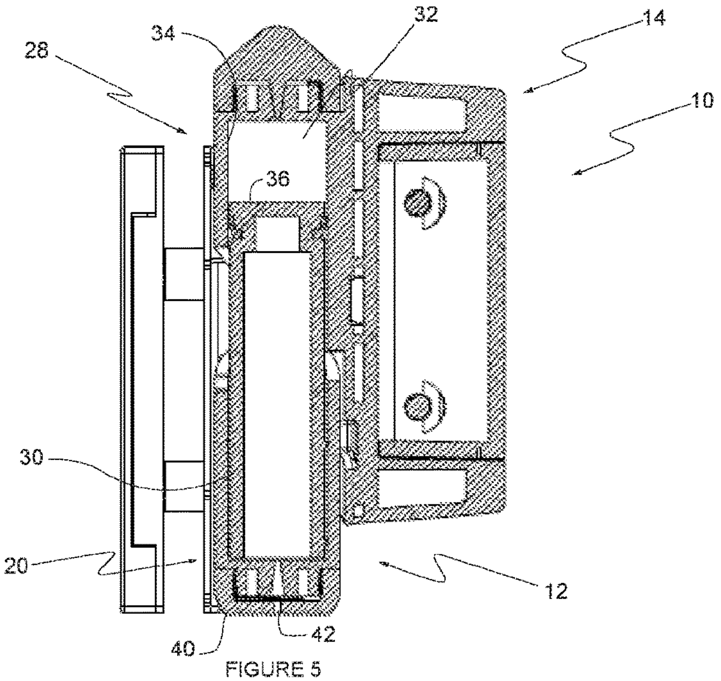
FIG. 5 is a cross-sectional view along the line A-A in FIG. 3 with the frameless glass fencing hinge in an open position.

The embodiment damping assembly 28 includes (i) a piston 30 secured to the first knuckle body 20, and (ii) a damping chamber 32 defined by (a) an internal surface 34, shown in FIG. 5, of the second knuckle body 24 and (b) a face 36 of the piston 30. Movement of the second leaf assembly 14 relative to the first leave assembly 12 causes the volume of the damping chamber 32 to be increased, as shown in FIG. 5, and decreased, as show in FIG. 4. When the volume of the damping chamber 32 is decreased the pressure of air in the damping chamber 32 will increase. It is the increase in the air pressure that will serve to arrest downward movement of the second leaf assembly 14 enabling operative soft closure of the embodiment frameless glass fencing hinge 10.

FIG. 4 shows that the piston 30 includes a seal 38 to deter the escape of air from the damping chamber 32 when the volume of the damping chamber 32 is decreased. The seal 38 is shaped to provide a high-pressure seal when the volume of the damping chamber 32 is reduced, but allows air to pass easily into the damping chamber 32 as its volume increases. The first knuckle body 20 is threadingly coupled to a base member 40 having an inlet hole 42 to permit air to enter the frameless glass fencing hinge 10 and to be fed to the damping chamber 32 past the seal 38.

In use, when the volume of the damping chamber 32 is reduced, resistance provided by air being compressed within the damping chamber 32 will increase at a rate that exceeds a linear rate. This feature provides a preferred soft-closing action. However, a completely sealed damping chamber 32 may deter full closure as the compressive force of the air within the damping chamber 32 may exceed gravitational force working on the second leaf assembly 14. To address this possible occurrence the damping assembly 28 includes an air-bleed control assembly 44.

The air air-bleed control assembly 44 includes an adjustor body 46 which threadingly engages the second knuckle body 24. The adjustor body 46 includes an elongate, tapering member 48 shaped for location within a complementally shaped tapering cavity 50 defined by the second knuckle body 20. The cavity 50 is in fluid communication with the damping chamber 32. In this embodiment both the elongate member 48 and the cavity 50 are conically shaped. By adjusting the amount of axial movement of the adjustor body 46 relative to the second knuckle body 24, the position of the elongate member 48 within the cavity 50 is adjusted. This feature enables the damping assembly 28 to be adjusted to cater for different applications resulting from doors of varying weight or dimensional configurations. In particular, by adjusting the position of the elongate member 48 within the cavity 50 a finely controlled space 52 between opposing mating surfaces of the adjustor body 46 and the second knuckle body 24 can be created to facilitate the controlled egress of air from the damping chamber 32.

In this embodiment the adjustor body 46 includes one or more non-illustrated stops which extend into the space 52 to provide pre-set adjustable increments.

The effect of the above described embodiment is that a glass panel held by the second leaf assembly 14 will constitute a gate of a frameless glass fencing barrier. Once a person has opened such gate and released their hold on the gate, the gate will close under the influence of gravity to provide self-closure. The damping assembly 28, in turn, will then operate to arrest movement of the gate during closing to enable soft closure.

In a non-illustrated embodiment the second knuckle body 24 is not coupled to the adjustor body 46 of the first embodiment. Rather, the second knuckle body 24 threadingly engages a base member which is identical in configuration to the base member 40 of the first embodiment frameless glass fencing hinge 10. The base member of the second knuckle 24 includes an air-bleed hole in fluid communication with the damping chamber 32 to release air from the damping chamber 32 for the purposes discussed above.

Figure 6:
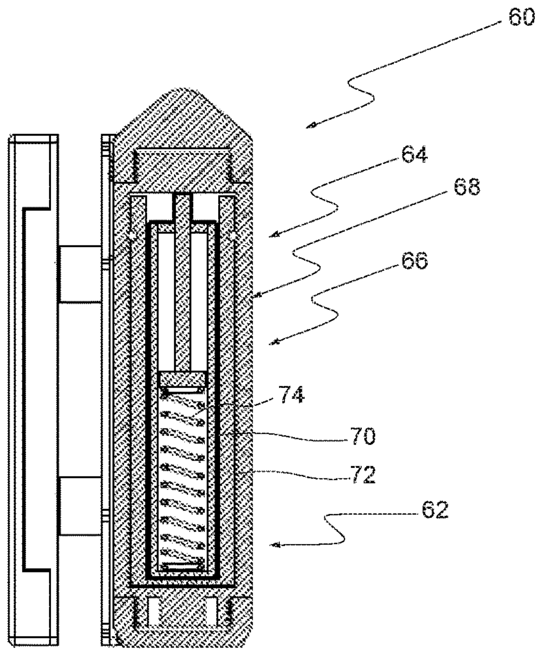
FIG. 6 is a cross-sectional view of a second embodiment frameless glass fencing hinge in a closed position.
Figure 7:
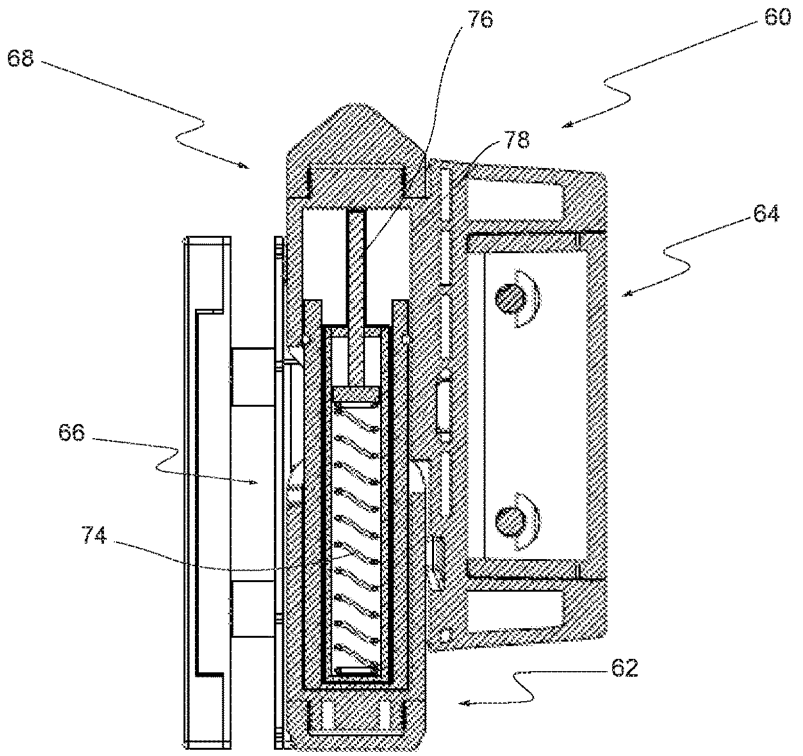
FIG. 7 is a cross-sectional view of the frameless glass fencing hinge of FIG. 6 in an open position.

FIGS. 6 and 7 show a second embodiment frameless glass fencing hinge 60 having a first and second leaf assembly 62 and 64. The frameless glass fencing hinge 60 operates in the manner described above in that the first leaf assembly 62 and the second leaf assembly 64 co-operate to define a cam formation 66. The cam formation 66 is operatively adapted to cause the second leaf assembly 64 to undergo axial movement along a hinge axis between a rest position, shown in FIG. 6, and a biased position, shown in FIG. 7, when the second leaf assembly 64 undergoes pivotal movement about the hinge axis. In this embodiment a damping assembly 68 is provided which includes a damping chamber 70 secured to a first knuckle body 72 of the first leaf assembly 62. The damping chamber 70 encloses a resilient damper body 74, here a helical spring. The damping assembly 68 further includes a piston 76 secured to a second knuckle body 78 of the second leaf assembly 64. The piston 76 is operatively associated with the resilient damper body 74 such that movement of the second leave assembly 76 from its biased position to its rest position causes translational movement of the piston 76, thereby impacting on the resilient damper body 74 causing it to become biased/loaded. Movement of the piston 76, and as a result movement of the second leaf assembly 14 under the influence of gravity, will be arrested by the damper body 74 as it becomes biased.

Figure 8:
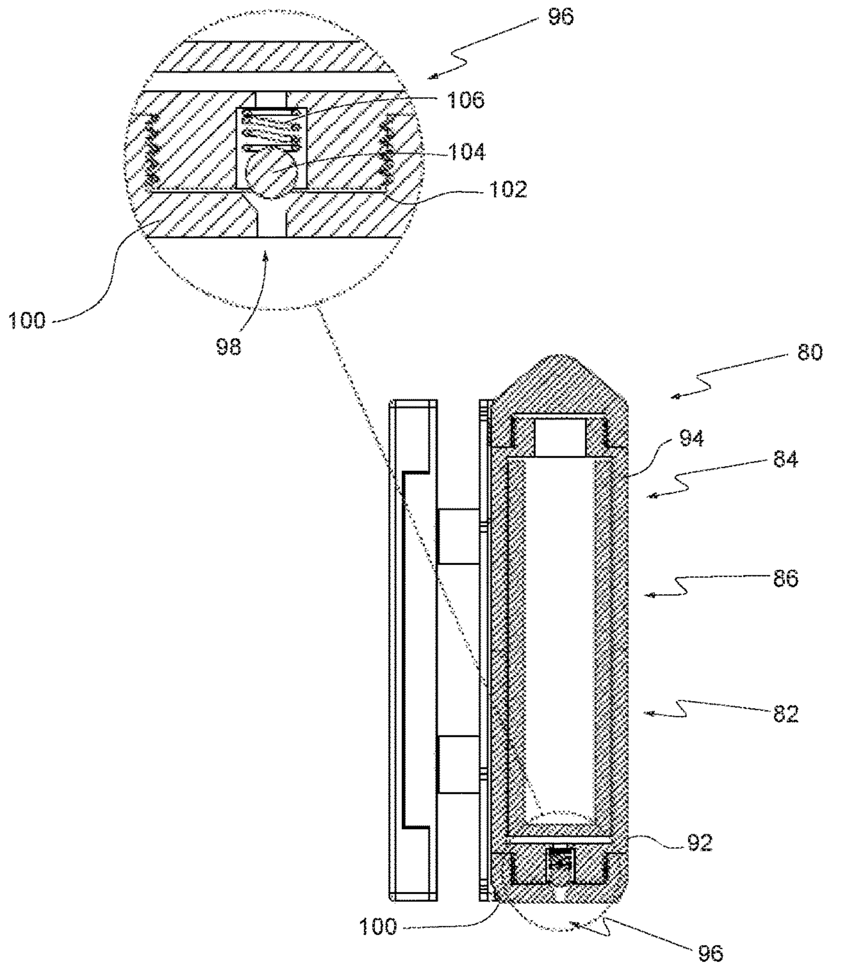
FIG. 8 is a cross-sectional view of a third embodiment frameless glass fencing hinge in a closed position.
Figure 9:
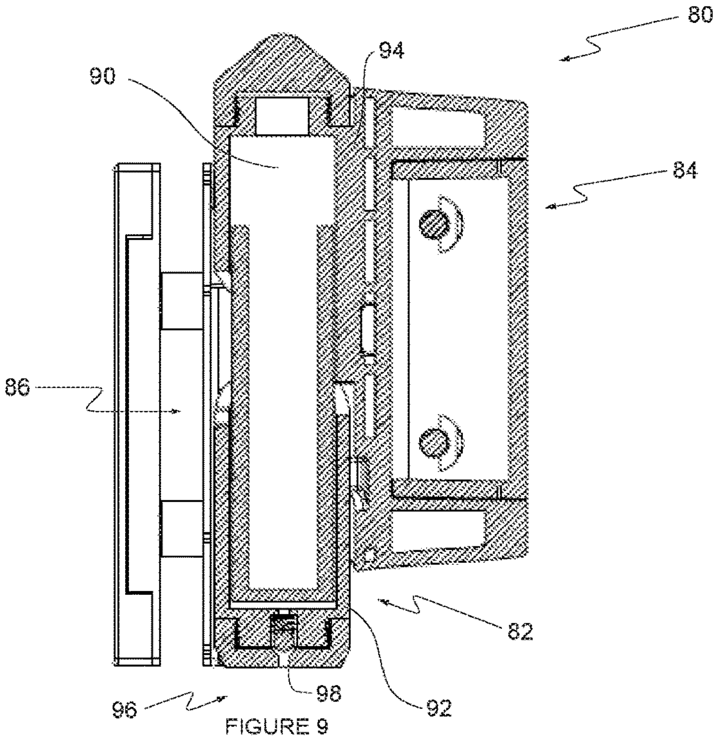
FIG. 9 is a cross-sectional view of the frameless glass fencing hinge of FIG. 8 in an open position.
Figure 10:
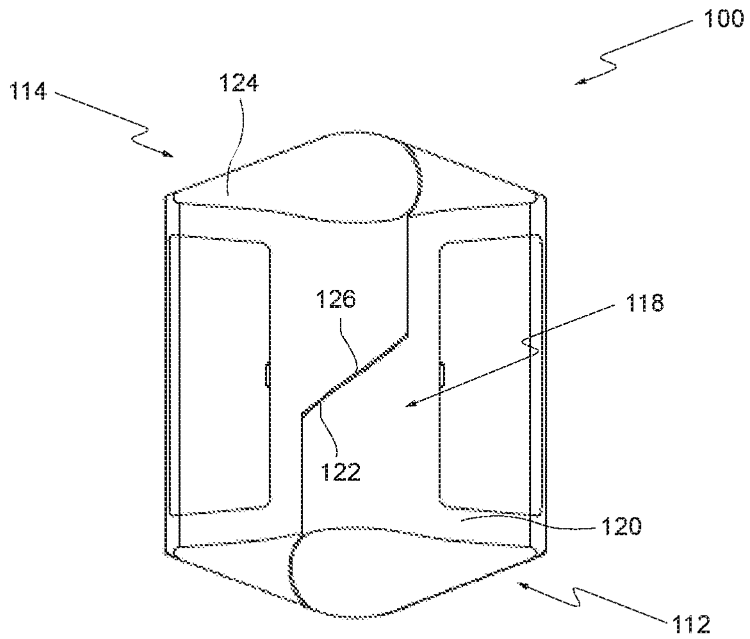
FIG. 10 is a front view of a fourth embodiment frameless glass fencing hinge in a closed position.
Figure 11:
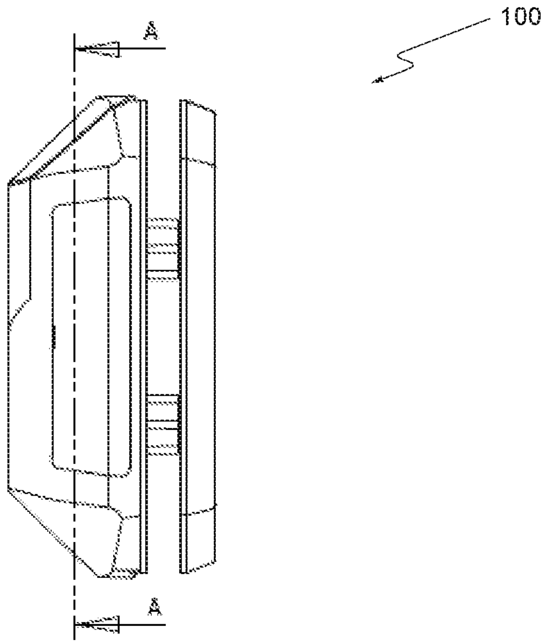
FIG. 11 is a side view of the frameless glass fencing hinge of FIG. 10.
Figure 12:
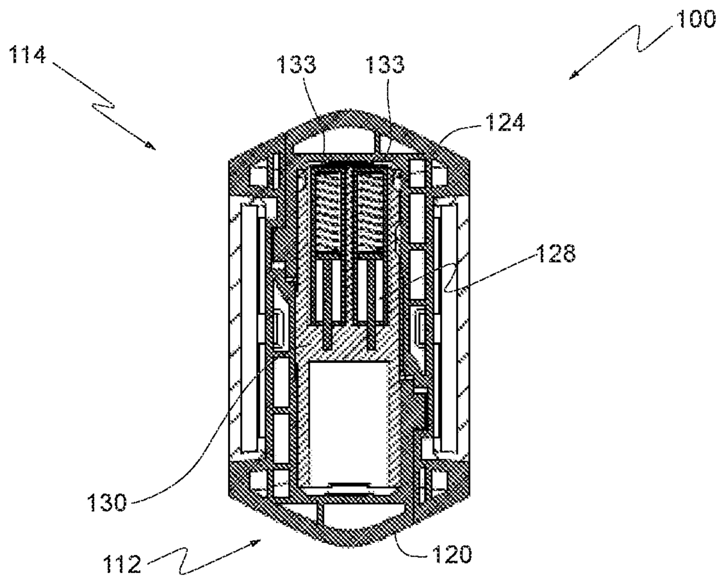
FIG. 12 is a cross-sectional view at the line A-A in FIG. 11 with the frameless glass fencing hinge in a closed position.
Figure 13:
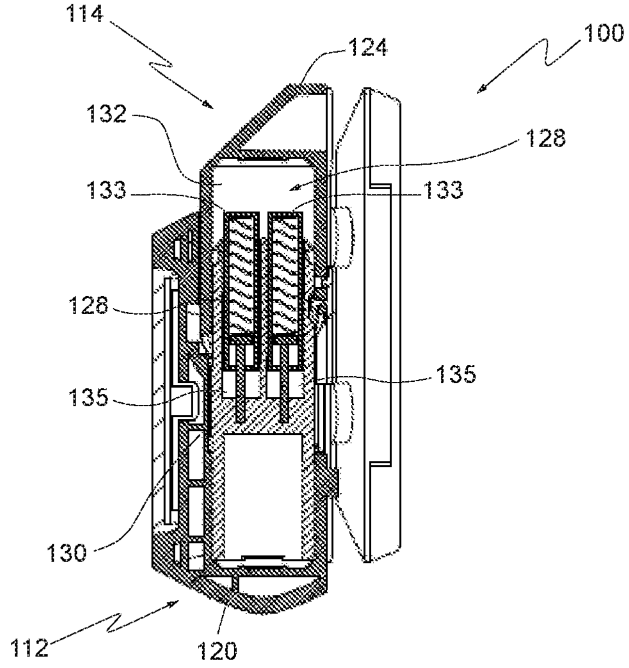
FIG. 13 is a cross-sectional view at the line A-A in FIG. 11 with the frameless glass fencing hinge in an open position.
Figure 14:
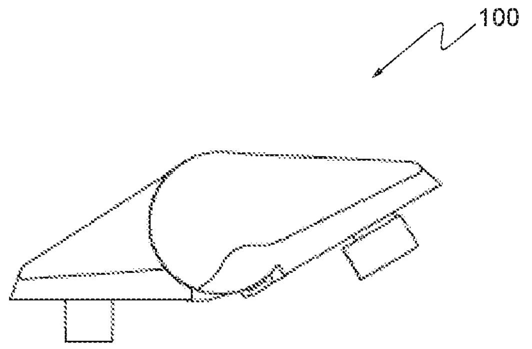
FIG. 14 is a top view of the frameless glass fencing hinge of FIG. 11 rotated through 30 degrees.

FIGS. 8 and 9 show a third illustrated embodiment frameless glass fencing hinge 80 having a first and second leaf assembly 82 and 84. The frameless glass fencing hinge 80 operates in the manner described above in that the first leaf assembly 82 and the second leaf assembly 84 co-operate to define a cam formation 86. The cam formation 86 is operatively adapted to cause the second leaf assembly 84 to undergo axial movement along a hinge axis between a rest position, shown in FIG. 8, and a biased position, shown in FIG. 9, when the second leaf assembly 84 undergoes pivotal movement about the hinge axis. In this embodiment a damping assembly 88 includes a damping chamber 90 enclosed by first and second knuckle bodies 92, 94.

The damping assembly 88 further includes a one-way valve 96 within the first knuckle body 94 to control release of air from the damping chamber 90 when the second leaf assembly 84 undergoes axial movement between its biased and rest positions. The one-way valve 96 is located proximate an inlet hole 98 of a base member 100. The inlet hole 98 has a tapering mouth 102 operatively adapted to be closed-off by a suitably sized spherical valve member 104. The valve member 104 is biased to an open condition with a resilient valve component, here a helical spring 106. In use the one-way valve 96 is adapted to allow the controlled release of air from the damping chamber 90.

FIGS. 10 to 16 show a fourth embodiment frameless glass fencing hinge 100 having a first and second leaf assembly 112 and 114. The frameless glass fencing hinge 100 operates in the manner described above for the frameless glass fencing hinge 10 in that the first leaf assembly 112 and the second leaf assembly 114 co-operate to define a cam formation 118. The cam formation 118 is operatively adapted to cause the second leaf assembly 114 to undergo operative upward axial movement along a hinge axis between a rest position, shown in FIG. 12, and a biased position, shown in FIG. 13, when the second leaf assembly 114 undergoes pivotal movement about the hinge axis.

The first leaf assembly 112 includes a first knuckle body 120 having a first cam surface 122. The second leaf assembly 114 includes a second knuckle body 124 having a second cam surface 126. The first and second cam surfaces 122, 126 provide the cam formation 118. In this embodiment a damping assembly 128 is provided by a piston 130, secured to the first knuckle body 120, which compresses air inside a damping chamber 132 to facilitate soft closing as discussed above. The damping assembly 128 further includes at least one spring biased damper 133, here there are two, held within damper slots 135 provided in the piston 130. The dampers 133 are configured to exert operative upward pressure/force on a contact position between the cam surfaces 122, 126 so as to create friction between the cam surfaces 122, 126 when the first and second leaf assembly 112, 114 undergo relative pivotal movement. The contact position is indicated with the reference numeral 131 in FIG. 15. When a gate employing the frameless glass fencing hinge 100 undergoes relative slow movement or is near to close, the dampers 133 are configured such that the pressure exerted by the dampers 133 will no longer cause friction between the cam surfaces 122, 126, thus allowing the gate to close completely. Having the dampers 133 held within the damper slots 135 will shield them from environmental factors such as moisture and sunlight. It is envisaged that a vent hole may be provided for certain applications which will allow heat to escape the damping chamber 132.

Figure 15:
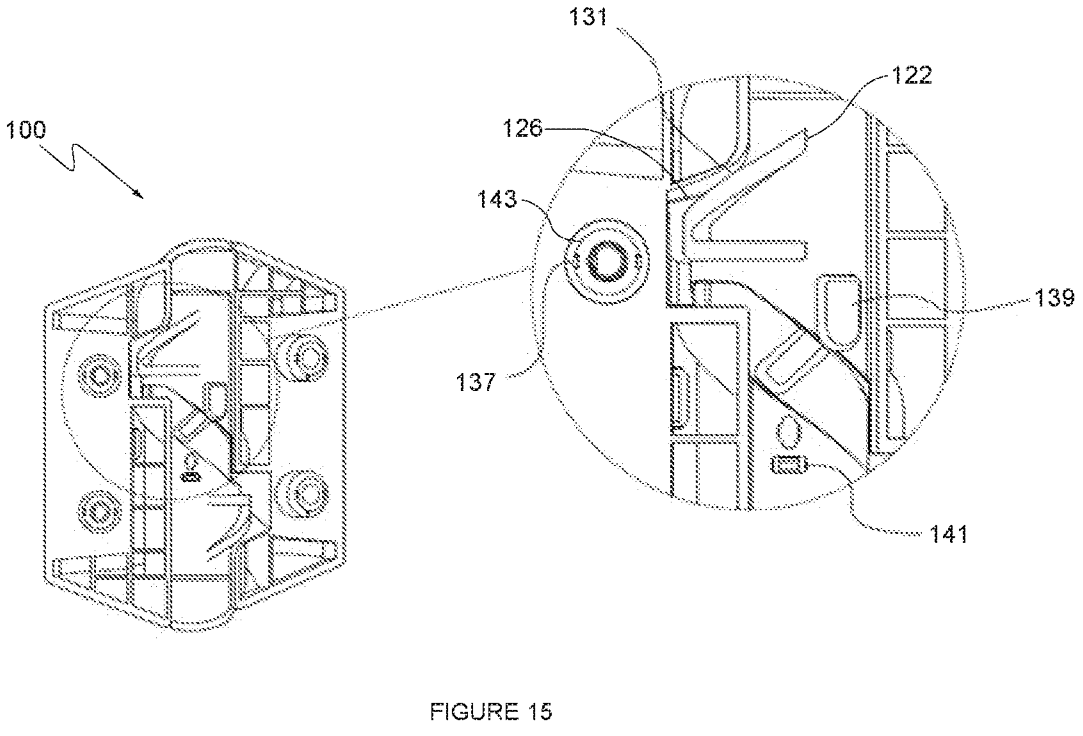
FIG. 15 is a rear view of the frameless glass fencing hinge of FIG. 14.

FIG. 15 shows by-pass detail 137 to release air when the frameless glass fencing hinge 100 is located in the closed position. FIG. 15 also illustrates a stop formation 139 to ensure the first and second leaf assemblies 112, 114 do not separate during installation. The stop formation 139 is adapted to swivel into a non-illustrated release condition if it is required to separate the first and second leaf assemblies 112, 114. A snap lock assembly 141 is provided for securing the piston 130 to the first knuckle body 120. The frameless glass fencing hinge 100 further includes a number of rotating bushes 143 to counteract "sag" caused by the weight of a gate and component tolerances.

Figure 16:
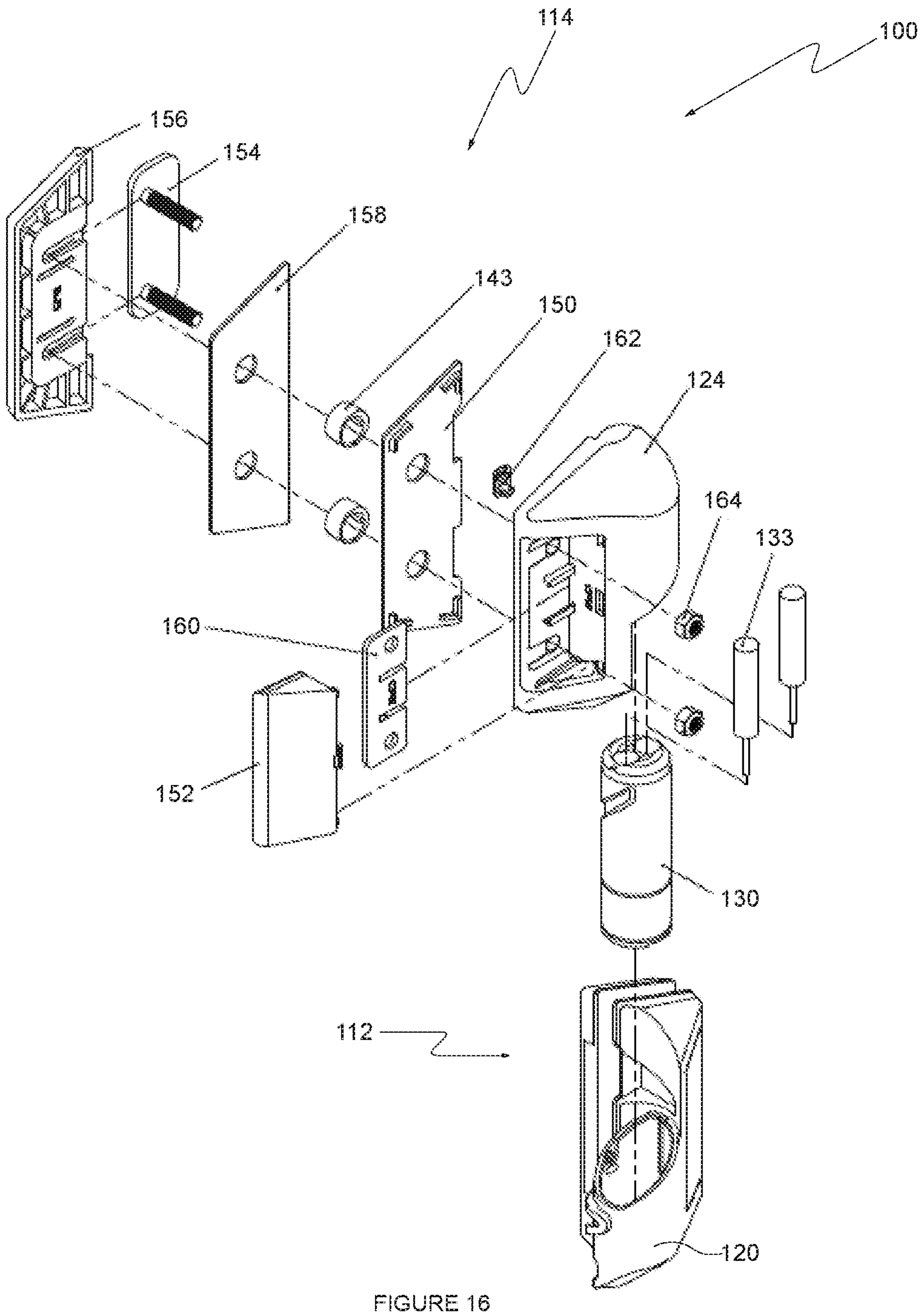
FIG. 16 is a partially exploded perspective view of the frameless glass fencing hinge of FIG. 11.

FIG. 16 shows a partial exploded view of the frameless glass fencing hinge 100 comprising the first knuckle body 120, the second knuckle body 124, the piston 130, dampers 133 and rotating bushes 143. The frameless glass fencing hinge 100 further includes a side gasket 150, side cover 152, clamping plate 154, clamping plate cover 156, clamping plate gasket 158, clamping washer 160, joiner 162 and clamp fastener 164.

Figure 17:
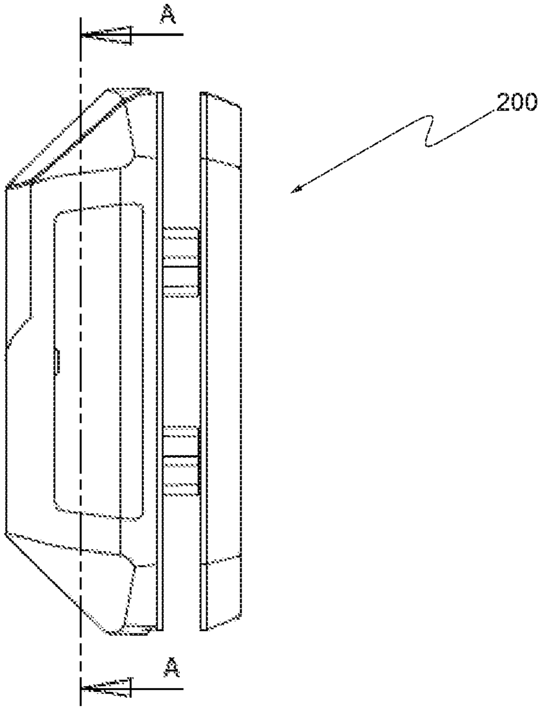
FIG. 17 is a side view of a fifth embodiment frameless glass fencing hinge of FIG. 10.
Figure 18:
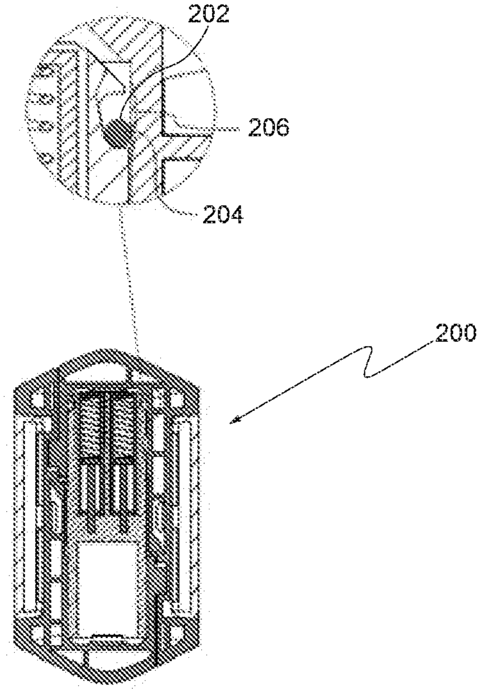
FIG. 18 is a cross-sectional view at the line A-A in FIG. 16 with the frameless glass fencing hinge in a closed position.
Figure 19:
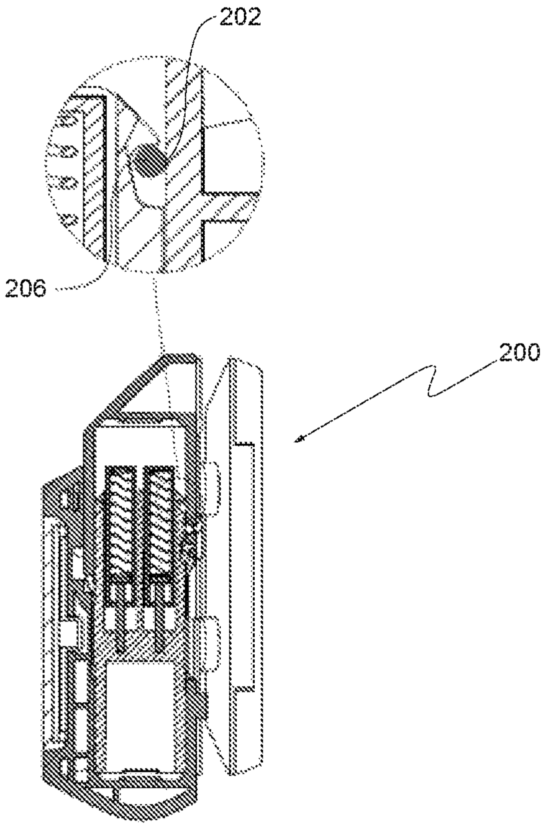
FIG. 19 is a cross-sectional view at the line A-A in FIG. 16 with the frameless glass fencing hinge in an open position.

FIGS. 17 to 19 show a fifth embodiment frameless glass fencing hinge 200. The frameless glass fencing hinge 200 operates in the same manner as the frameless glass fencing hinge 100. The frameless glass fencing hinge 200 differs from the glass fencing hinge 100 in that it includes an O-ring 202, shown in the open position at 204 in FIG. 18, and the closed position 206 in FIG. 19. The O-ring 202 forms part of the damping assembly of the frameless glass fencing hinge 200 wherein in the close position 204 compressed air will provide friction to facilitate additional gate slowing properties. A small by-pass passage 206 is provided for releasing air in the closed position 206.

The embodiment frameless glass fencing hinges described above are vertically installed. In one exemplary non-illustrated installation method the first leaf assembly is attached to an in situ installed hinge panel. The second leaf assembly, in turn, is attached to a gate panel. An installer holds the gate panel at 90 degrees relative to the hinge panel. The gate panel is hereafter lifted so that it is slightly above and aligned with the hinge panel. The gate panel is now lowered so that the first and second leaf assemblies can engage and become joined. Once the gate panel is swung away from the 90-degree position it is no longer possible to separate the leaf assemblies and thus the gate panel and hinge panel are connected for operation. To remove the gate the reverse operation is followed in that the gate panel is orientated at 90 degrees whereafter it can be lifted and separated from the hinge panel.

The above discussed first and second leaf assemblies can be produced from steel, aluminium or an engineering plastic. In preferred embodiments the steel is mild steel, stainless steel or an alloy steel.

If an engineering plastic is employed the engineering plastic is generally covered with a coating.

Further, when employing an engineering plastic, such engineering plastic will generally include a base material having a reinforcing filler. Examples of reinforcing filler include glass fibre and/or carbon fibre.

Examples of engineering plastic include a polyarylamide, preferably polyarylamide including glass fibre reinforcement. Typically, the concentration of glass fibre reinforcement is between 50% to 60% by volume.

In an alternative embodiment the engineering plastic is an epoxy vinyl ester resin, preferably epoxy vinyl ester resin including glass fibre reinforcement. Typically, the concentration of glass fibre reinforcement is between 50% to 70% by volume.

In another embodiment the base material includes a polyamide such as nylon. The base material could also include polyphenylene sulphide (PPS) or a styrene.

Conventional frameless glass fencing components are produced from stainless steel or anodised aluminium. Drawbacks of employing such materials include relative high weight and costs. Further drawbacks associated with stainless steel products include that they tend to stain and corrode over a short or prolonged period of time if they are not sufficiently coated. In preferred embodiments of the present disclosure those problems are addressed by doing away with stainless steel/aluminium and providing a hinge produced from an engineering plastic. Also, as plastic generally does not conduct electricity, this feature will provide enhanced safety in a moist environment, such as a swimming pool. In particular the preferred engineering plastic will meet the requirements of AS3000:2007 for earth bonding where frameless glass fencing hinges are within arm's reach or up to 1.25 m from the water's edge of a swimming pool.

Although the above description has focused on a hinge for a frameless glass fencing installation it will be appreciated that it could be employed in a range of other hinge applications unrelated to frameless glass fencing installations. For example, a hinge for a solid metal or timber entrance door hinged within a metal or timber door frame, a self-closing hinge for an aluminium or steel framed metal swimming pool gate with vertical bars, which gate is hinged from and attached to a metal post and the gate closing and latching to another metal post. The hinges may be used for a side gate or a hinge for entrance gates, paddock gates or any external gates including security or privacy gates. The hinges may also support an entrance door to a building which door may be of frameless glass or framed glass, or a solid door. Similarly, the hinge may be used for the closure of frameless glass shower doors.

Although the invention is described above in relation to preferred embodiments, it will be appreciated by those skilled in the art that it is not limited to those embodiments, but may be embodied in many other forms.

The invention claimed is:

1. A frameless glass fencing hinge for a frameless glass fencing installation, the frameless glass fencing hinge including:

a first leaf assembly for operative attachment to a first glass panel or building structure; and a second leaf assembly for operative attachment to a second glass panel, the second leaf assembly operatively adapted to undergo pivotal movement about a hinge axis so as to move the second glass panel between a closed position and an open position with the open position providing access to an area enclosed by the frameless glass fencing installation and the ability to exit from the frameless glass fencing installation;

wherein the first leaf assembly and the second leaf assembly define a cam formation operatively adapted to cause the second leaf assembly to undergo axial movement along the hinge axis between a rest position and a raised position when the second leaf assembly undergoes pivotal movement about the hinge axis;

wherein (i) the first leaf assembly includes a first knuckle body having a first cam surface, and (ii) the second leaf assembly includes a second knuckle body having a second cam surface operatively adapted for contact with the first cam surface, the first and second cam surfaces being configured such that movement of the second cam surface along the first cam surface causes the second leaf assembly to move axially along the hinge axis;

wherein the first and second cam surfaces are operatively adapted such that movement of the second cam surface along the first cam surface causes the second leaf assembly to be displaced vertically when the second leaf assembly undergoes axial movement along the hinge axis;

wherein the first and second cam surfaces are adapted to permit the second leaf assembly to move from the raised position to the rest position under the influence of gravity;

wherein the frameless glass fencing hinge includes a damping assembly to arrest movement of the second leaf assembly between the raised position and the rest position; and wherein the damping assembly includes (i) a piston secured to the first knuckle body, and (ii) a damping chamber defined by an internal surface of the second knuckle body and a face of the piston, wherein movement of the second leaf assembly relative to the first leaf assembly causes the volume of air within the damping chamber to be increased and decreased respectively when the glass panel is moved between the closed position and the open position.

2. A frameless glass fencing hinge according to claim 1, wherein the piston includes a seal to deter the escape of air from the damping chamber when the volume of air within the damping chamber is decreased.

3. A frameless glass fencing hinge according to claim 2, wherein the second knuckle body includes an air-bleed hole in fluid communication with the damping chamber to release air from the damping chamber.

4. A frameless glass fencing hinge according to claim 3, wherein the damping assembly includes an air-bleed control assembly, the air air-bleed control assembly including an adjustor body having a protruding member shaped for location within a complemental cavity defined by the second knuckle body, the cavity being in fluid communication with the damping chamber.

5. A frameless glass fencing hinge according to claim 4, wherein a location of the protruding member within the cavity of the second knuckle body is adjustable.

6. A frameless glass fencing hinge according to claim 1, wherein the damping assembly includes (i) a damping chamber secured to the first knuckle body, the damping chamber enclosing a resilient damper body, and (ii) a piston secure to the second knuckle body, the piston operatively associated with the resilient damper body such that movement of the second leaf assembly from the raised position to the rest position causes movement of the piston so as to bias the resilient damper body.

7. A frameless glass fencing hinge according to claim 1, wherein the first and second leaf assemblies each includes a pair of opposing leaf members operatively adapted to hold a glass panel.

8. A frameless glass fencing hinge according to claim 1, wherein the damping assembly includes at least one damper operatively adapted to apply a force to the first and second cam surfaces so as to generate friction between the first and second cam surfaces when the second leaf assembly undergoes pivotal movement relative to the first leaf assembly.

* * * * *